March 5, 1957
A. D. DIRCKSEN ET AL
2,784,304
UTILITY LAMP
Filed Dec. 4, 1953
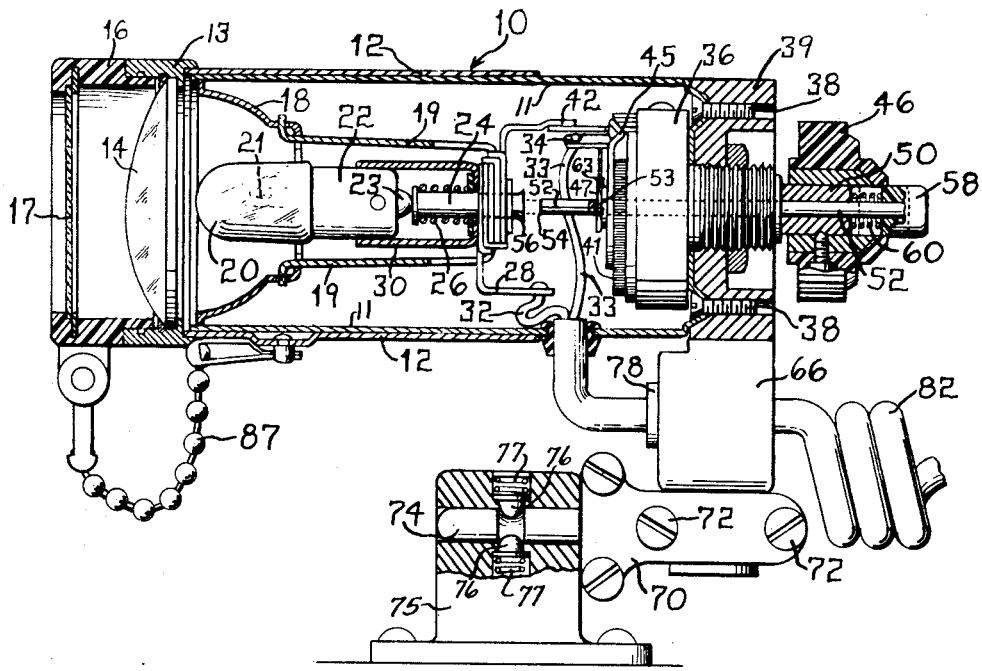
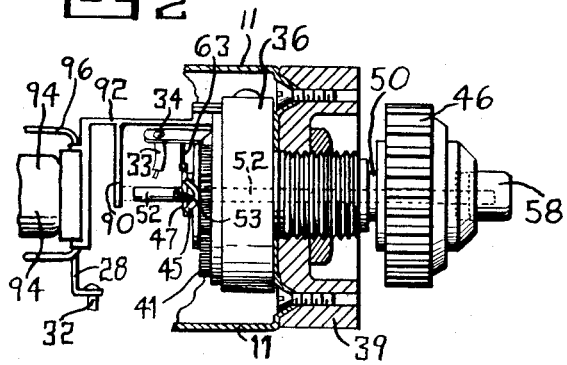
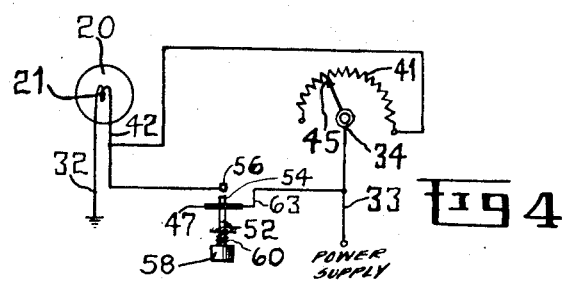
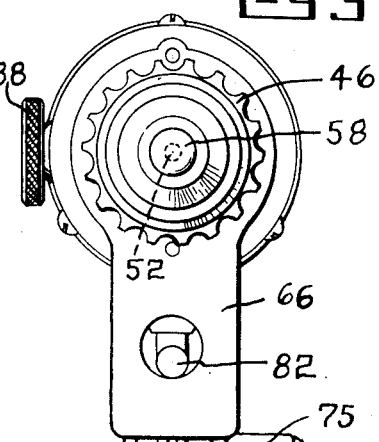
INVENTORS
ARNOLD D. DIRCKSEN
GEORGE S. ELSNER
BY
THEIR ATTORNEYS

United States Patent Office 2,784,304
Patented Mar. 5, 1957

2,784,304

UTILITY LAMP

Arnold D. Dircksen, Spring Valley, and George S. Elsner, Dayton, Ohio, assignors to Standard-Thomson Corporation, Dayton, Ohio, a corporation of Delaware Application December 4, 1953, Serial No. 396,183

2 Claims. (Cl. 240—8.16)

This invention relates to a utility lamp. It relates more particularly to a utility lamp adapted to be used as a cock-pit lamp; however, the invention is not so limited in that it may be used with other types of light sources and in other applications.

The problem has existed in the art of light sources for use within aircraft. The problem is related to the desirability of a light source which normally emits an amount of light less than full intensity. However, it is desired to have provided with the light source means by which full intensity may be obtained quickly and easily.

Hence, an object of this invention is to provide a light source for use in the cock-pits of aircraft which emits a rheostat controlled light under normal conditions and which may be readily and easily actuated to obtain full light intensity.

A further object of the invention is to provide a utility lamp for use in automobiles or other vehicles, as well as in aircraft.

Another object of the invention is to provide an easily adjustable general purpose utility lamp.

A further object of the invention is to provide a utility lamp having a mounting base from which the utility lamp may easily be manually grasped and made portable.

A further object of the invention is to provide a utility lamp having means of controlling the intensity of the light, said means including closely associated means of control for instant operation of the light at full brilliancy.

Still a further object of the invention is to provide a utility lamp which is small, compact, light in weight, and adapted to be portable.

Still a further object of the invention is to provide a rheostat which has readily accessible adjustment means which means include means for quickly shorting out the adjusted resistance of the rheostat.

Other objects and advantages reside in the construction of parts, the combination thereof and the mode of operation, as will become more apparent from the following description.

In the drawing Figure 1 is a side sectional view of the utility lamp of this invention.

Figure 2 is a fragmentary side sectional view showing a preferred modification of the switch elements of the utility lamp.

Figure 3 is a rear elevational view of the utility lamp of this invention.

Figure 4 is a schematic wiring diagram disclosing the electrical circuit of the utility lamp.

Referring to the drawing in detail, reference number 10 indicates generally a utility lamp of this invention. An inner cylindrical housing 11 telescopically supports an outer housing 12. At one end of the outer housing 12 is attached a collar 13 within which is rigidly supported an arcuate lens 14. Removably attached to the collar 13 is a lens holder 16 within which is supported a filter lens 17.

Mounted rearwardly of the arcuate lens 14 is a reflector 18 attached to a support 19, within which is mounted a light bulb 20 having a filament 21 and provided with a base 22. The base 22 is provided with a contact tip 23 which engages a contact pin 24 which is resiliently biased against the contact tip 23 by means of a spring 26. A connector bracket 28 is rigidly attached to a socket member 30 in which the base 22 and the contact pin 24 are retained. The socket member 30 provides electrical contact between the base 22 of the bulb 20 and the connector bracket 28 which is electrically connected to a "grounded" end of an electric circuit by means of a conductor 32. The other side of the electric circuit is provided with a line 33 leading to power supply connections. The line 33 is rigidly connected to a contact lug 34 of a rheostat 36. The rheostat 36 is mounted adjacent the rearward end of the inner cylindrical housing 11 by means of a plurality of screws 38 threadedly engaging a base 39 of the cylindrical housing 11. One end of a resistance element 41 of the rheostat 36 is electrically connected to the contact pin 24 by means of a bus 42.

As shown in Figure 4, the rheostat 36 is connected into the electric circuit in such a manner that it may be used to change the resistance in the circuit leading to the filament 21 from the line 33. A contact finger 45 slidably engages the resistance element 41 of the rheostat 36 and is supported by an apertured contact collar 47 which is secured to the end of the shaft 50. The contact finger 45 is rotatably operated by means of a knob 46 which is firmly attached to a shaft 50. The knob 46 is attached adjacent one end of the shaft 50, and adjacent the other end of the shaft 50 is rigidly attached the contact collar 47 provided with the contact finger 45. The shaft 50 is provided with a longitudinal bore through which is slidably mounted a contact rod 52, the rearward movement of which is limited by a lock pin 53. The contact rod 52 extends beyond the length of the shaft 50, through the contact collar 47, and has a contact end 54 which is adapted to abuttingly engage a concave end 56 of the contact pin 24. A button 58 is attached to the contact rod 52 at the end opposite the contact end 54. A helical spring 60 encircling the contact rod 52 is disposed intermediate the end of the shaft 50 and the button 58. The helical spring 60 resiliently positions the lock pin 53 of the contact rod 52 against the contact collar 47, and thus resiliently retains the contact end 54 out of engagement with the concave end 56 of the contact pin 24. The contact rod 52 slidably mounted within the shaft 50 slidably engages the inner portion of the contact collar 47 which is attached to the shaft 50. A brush arm 63 is attached to the contact lug 34 and engages the external surface of the contact collar 47. Thus the contact rod 52 has electrical contact through the contact collar 47 with the contact finger 45 and with the contact lug 34.

Under ordinary operating conditions the contact finger 45 is rotatably adjusted in such a manner that a portion of the resistance element 41 of the rheostat 36 is inserted into the circuit leading to the filament 21 through the bus 42. Consequently, the light emitted from the bulb 20 is normally less than full brilliancy. When it is desired to obtain full light intensity from the bulb 20, it is possible to do so quickly and easily by manually pressing the button 58 which slidably moves the contact rod 52 so that the contact end 54 abuttingly engages the concave end 56 of the contact pin 24. Thus, as diagrammatically shown in Figure 4, engagement of the contact rod 52 with the contact pin 24 shorts out the adjusted resistance of the rheostat 36 through the contact collar 47 so that full line voltage of the power supply is impressed across the filament 21 of the light bulb 20.

A handle 66 of the utility lamp 10 is secured in a clamping ring 70 and retained therein by means of a plurality of screws 72. Attached to the clamping ring 70 is a plug 74 which is adapted to be removably attached within a mounting base 75. The plug 74 is secured within the base 75 by means of a plurality of balls 76 resiliently biased by springs 77.

Through a sleeve 78 within the handle member 66 is inserted the conductor 32 and the line 33 leading from the power supply. The lines 32 and 33 are disposed within a covering 82.

If it is desired to manually support the utility lamp 10, it is possible to do so by pulling the plug 74 out of the base 75. The utility lamp 10 then may be manually grasped by means of the handle 66 and moved as desired, limited only by the length of the leads 32 and 33 within the covering 82. The plug 74 may easily be manually inserted into the base 75 as snap action of the balls 76 secure the plug 74 as shown in Figure 1.

A preferred modification in the means of shorting the adjusted resistance of the rheostat is shown in Figure 2 in which an arm 90 extends downwardly from a contact bus 92 which joins one end of the rheostat 36 to a socket member 94 which is attached to a support 96. Longitudinal movement of the contact rod 52 thereby engages the arm 90 instead of the contact pin 24 of the preferred embodiment as shown in Figure 1. Thus the adjusted resistance of the rheostat 36 may be shorted by pressing the button 58 as described with respect to the preferred embodiment.

Thus it may be understood that the utility lamp of this invention provides an easily adjustable light source. The intensity of the light source is easily adjustable by means of the rheostat 36, and full intensity of the light source is readily obtainable by pressing the button 58 at the center of the knob 46 of the rheostat 36.

A chain 87 attached to the lens holder 16 and to the outer housing 12 prevents loss of the lens holder 16 when it is removed from the collar 13.

A clamp bolt (not shown) may be rotated by means of a knurled head 88 to lock or unlock the position of the outer housing 12 with respect to the inner housing 11. When the clamp bolt is unlocked the outer housing 12 with the collar 13 and the arcuate lens 14 attached thereto may be telescopically adjusted, changing the light emitted through the arcuate lens 14 in varying degrees from a flood type of light to a spot type of light as the outer housing 12 is telescopically moved with respect to the inner housing 11.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. In a utility lamp comprising a cylindrical housing, a lens disposed at one end thereof, a light bulb positioned adjacent the lens, the light bulb having two electrical connection leads, a resistor provided with two terminal ends for electrical connection thereto and supported by the cylindrical housing adjacent the end thereof opposite the lens, an adjustable contact arm engaging the resistor for varying the effective resistance thereof, a hollow shaft supported by the resistor and connected to the contact arm for movement thereof, one electrical connection lead of the light bulb being electrically connected to one terminal end of the resistor, a contact conductor rod slidably mounted within the hollow shaft and electrically connected to the contact arm, the contact conductor rod being axially movable within the hollow shaft, a stationary contact electrically connected to the said one terminal end of the resistor, the stationary contact being in axial alignment with the contact conductor rod and engageable thereby, the contact conductor rod being resiliently biased in the direction opposite the stationary contact, rotational movement of the hollow shaft thus causing change in adjusted position of the contact arm thus changing the resistance value of the resistor between said terminal end thereof and the contact arm, axial movement of the conductor rod and engagement thereby with the stationary contact thus causing by-passing of the adjusted resistance of the resistor.

2. A utility lamp of the type provided with a housing, a light bulb mounted therein, a source of electrical energy, the combination comprising a resistor mounted within the housing, the resistor being provided with two terminal ends, a rotatable hollow shaft having a portion within the housing, the hollow shaft being supported by the housing concentric therewith, a contact finger engaging the resistor and attached to the hollow shaft for rotative movement by the hollow shaft, a conductor bus connecting one end of the resistor to the light bulb, the conductor bus being provided with a contact projection, a contact conductor rod slidably supported within the hollow shaft and extending therefrom, the contact conductor rod being electrically connected to the contact finger and being in alignment with the contact projection, the contact conductor rod having an end engageable with the contact projection, resilient means urging the contact conductor rod in the direction opposite the contact projection, a knob attached to the hollow shaft concentric therewith for rotation thereof, conductor means electrically joining the contact finger to the source of electrical energy, and conductor means joining the light bulb to the source of electrical energy.

References Cited in the file of this patent

UNITED STATES PATENTS

| 1,212,907 | Clymer | Jan. 16, 1917 |
| 1,572,645 | Francesco | Feb. 9, 1926 |
| 2,337,746 | Garstang | Dec. 28, 1943 |
| 2,411,891 | Owens | Dec. 3, 1946 |

FOREIGN PATENTS

| 474,200 | Great Britain | Oct. 27, 1937 |